Oct. 18, 1949.  S. K. ANDERSEN  2,485,522
HUMIDITY CONTROL IN AIRCRAFT AIR CONDITIONING
Filed Sept. 4, 1945
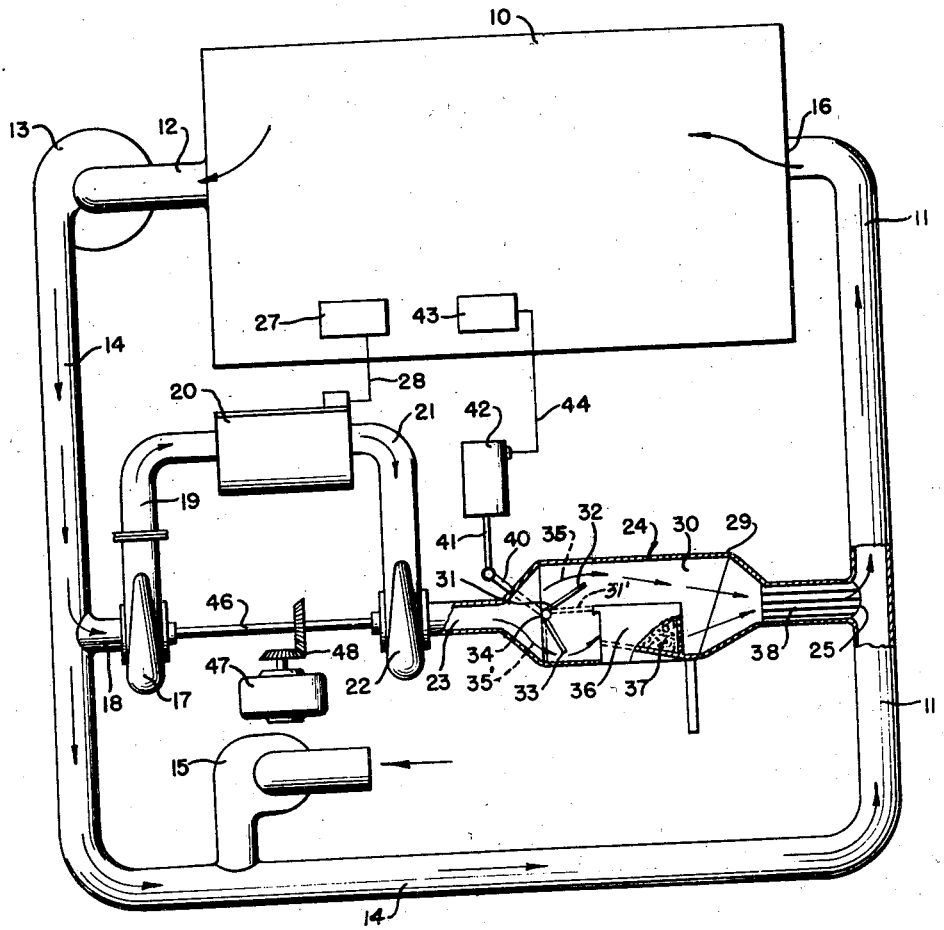
INVENTOR.
SOREN K. ANDERSEN
BY
ATTORNEY Patented Oct. 18, 1949

2,485,522

UNITED STATES PATENT OFFICE 2,485,522

HUMIDITY CONTROL IN AIRCRAFT AIR CONDITIONING

Soren K. Andersen, Los Angeles, Calif., assignor to The Garrett Corporation, Airesearch Manufacturing Company Division, Los Angeles, Calif., a corporation of California Application September 4, 1945, Serial No. 614,323

13 Claims. (Cl. 236—44)

1

My invention relates to air conditioning systems for aircraft and relates in particular to an air conditioning system which embraces the economics resulting from the use of expansion turbines in the cooling of air delivered into or circulated through aircraft cabins, and which exercises a control over the humidity of the air without necessity of replacing or adding moisture to make up for the excess removal of water from the air occurring where an expansion turbine is employed as a means for reducing the temperature of and recovering power from a flow of air in an air cooling system.

It is an object of the invention to provide an air conditioning system for use in aircraft which is comparatively economical and light in weight so that it can be used in aircraft, wherein a relatively small portion of the total volume of the air circulated through or delivered into the cabin is cooled to a comparatively low temperature, partly de-humidified and then mixed with the balance of the air which is flowing as a stream toward the cabin interior.

It is an object of the invention to provide an air conditioning system of the above character having simple means for removing only a controlled portion of the moisture from the relatively small flow of air which has been cooled to low temperature, and then adding this moisture-conditioned air to the main flow of air toward the cabin, in such a manner that the condensation of moisture will be substantially confined to the moisture removal zone of the apparatus, thereby maintaining the condensation of moisture in the main air duct of the air conditioning system at a minimum.

It is an object of the invention to provide a method and apparatus wherein the cooled air is conducted into a humidity control unit having therein a moisture removing element and means for diverting a portion of the cooled air through the moisture removing element so that moisture will be extracted from a portion of the air determined by the humidity of the air in the aircraft cabin, this humidity control unit having means for minimizing the condensation of moisture from the remaining or undiverted portion of the cooled air. In this invention the cooled and humidity-adjusted air from the humidity control unit is intermixed with the main volume of air which is flowing toward the cabin and constitutes a means for regulating the humidity of this main flow of air, in accordance with the cabin requirements.

A further object of the invention is to provide

2 a humidity control unit having therein a proportioning valve for diverting a proportion of the cooled air through the water removal zone of the humidity control unit, this proportioning valve being actuated in accordance with the needs of the cabin interior determined by a humidostat which controls the action of a motor or motivating means connected to the proportioning valve so as to move it into its different positions of air-flow regulation.

Further objects and advantages of the invention will be brought out in the following part of the specification.

In the drawing which is schematic in character and for illustrative purposes only, I show an aircraft cabin 10 which receives a flow of air from a main air duct 11. Herein the term "cabin" is used in the broad sense or meaning of a space or compartment which is air-conditioned. Circulation of air through the cabin is accomplished by release of air from the opposite end of the cabin 10 through an outlet duct 12 leading to the intake of a blower 13, the outlet of which blower 13 is connected by a duct 14 with the main air duct 11, thereby forming a cabin air recirculating system. A replenishment blower or air compressor 15 is provided for delivery of replenishment air into the cabin. This blower or compressor 15 is shown connected to the duct 14. The quantity of air pumped by the device 15 will, of course, depend upon the pressure conditions required in the aircraft cabin 10. If the aircraft is being flown at levels below the altitude requiring pressurization, the blower 15 will serve merely as a means for adding to the cabin air only a sufficient volume of air to accomplish oxygen replacement, but if pressurization of the cabin 10 is required, the blower 15 will be required to feed sufficient air under pressure into the system to maintain required pressure in the cabin.

A portion of the air which is flowing from the blower 13 toward the air inlet 16 by which the duct 11 is connected to the cabin interior, is diverted through an air cooling and humidity regulating system S which comprises a compressor or blower 17 having its inlet connected through a duct 18 with the conduit 14, and having its outlet connected through a duct 19 with a cooler 20. The outlet of the cooler 20 is connected through a duct 21 with the inlet of an expansion turbine 22 through which the air compressed by the blower 17 and cooled by the cooler 20 is further cooled and reexpanded into a duct 23 which leads to a humidity control unit 24 having an outlet 25 connected with the main air duct 11 so that the cooled and humidity regulated air which is passed through the system S may be added to the comparatively large flow of air through the duct 11.

The diagrammatically shown cooler 20 may be any of the known devices for extracting heat from a flow of air. Accordingly, it will be recognized that this cooler 20 may be a heat exchanger or a part of a mechanical refrigerating system employing a condensible refrigerant. The cooler 20 is controlled in accordance with changes in temperature in the cabin 10 by control means of any of the known types, including a thermostat 27 having operative connection with the cooler 20 as diagrammatically indicated at 28. The humidity control unit 24 includes a shell 29 forming a chamber 30. At the forward end of this chamber 30 there is a flow directing and proportioning valve 31 comprising upper and lower walls 32 and 33 which are connected to a transverse shaft 34 in such positions that they extend from the shaft 34 at substantially right angles.

The proportioning valve 31 is shown in an intermediate position so as to divide the flow of cold air from the duct 23 into an upper path of flow and a lower path of flow indicated respectively by arrows 35 and 35'. The lower path of flow 35' is through a moisture removal zone comprising a filter 36 having therein means for causing condensation of moisture from the flow of cold air which passes therethrough, such means being shown as a mass of fibers or filamentous material 37 forming a myriad of tortuous passages and a large surface area exposed to the flow of moisture laden cold air.

The moisture entrained in the air as it leaves the expansion turbine 22 consists of very fine globules which, if maintained at the small size in which they are formed in the outlet of the turbine 22, will remain in suspension as the air flows through a duct substantially without turbulence. So as to minimize turbulence of the air stream as it leaves the humidity control unit 24, thereby minimizing the coalescence of these small moisture globules which will causes them to coalesce into droplets or drops of water, I provide in the humidity control unit 24 and particularly in the outlet portion thereof flow straightening means 38 comprising parallel walls forming parallel passages through which the air passes in such a manner as to minimize turbulent flow in the air and thereby minimize contact or collision between the minute moisture globules.

The shaft 34 of the flow proportioner 31 has a lever 40 fixed thereon connected through a link 41 with a reversible motor mechanism 42 for swinging the flow proportioner 31 through its various positions. The motor mechanism 42 is controlled by a humidostat 43 situated within the cabin 10, this humidostat 43 having operative connection with the motor mechanism 42 as indicated diagrammatically by the line 44. The humidostat control of the reversible motor mechanism 42 is indicated only diagrammatically for the reason that this part of the applicant's system follows prior art practices such, for example, as shown in the abandoned application of William G. Rommel, Serial No. 547,269, filed July 29, 1944, for Humidity indicator and control.

The rotors of the compressor 17 and the reexpansion turbine 22 are interconnected by shaft means 46 whereby power recovered by the reexpansion of air in the turbine 22 is carried back to the compressor 17, thereby reducing the load on the motor 47 which is shown driving the shaft 46 through bevel gearing 48.

In the operation of the invention a comparatively small flow of air, as compared to the main flow of air into the cabin through the duct 11 is compressed to whatever extent may be required and is passed through the cooler wherein a thermostat controlled quantity of heat is abstracted therefrom. The reexpansion of the cooled, compressed air through the reexpansion turbine 22 brings the temperature of the air to a low value and reduces the moisture in the air to extremely fine globules which remain in suspension in the air. Under control of the humidostat 43 and the motor mechanism 42, the proportioning valve 31 is moved into its required position. If the humidity of the air in the cabin is above a preselected value, a corresponding proportion of the air will be passed through the moisture removal zone of the humidity control unit represented by the filter 36. It will be understood that under control of the humidostat 43, the proportioning valve 31 may be positioned as indicated by dotted lines 31' so that the entire flow of cooled air follows the path indicated by the arrows 35, no moisture being then removed from the air, except such small amount as may condense on the surfaces of the walls of the humidity control unit 24. Under ordinary conditions of operation, the proportioning valve 31 is maintained in an intermediate position such as that in which it is shown in full lines. However, there may be times when the great humidity in the cabin air will require that all of the cooled air be passed through the filter 36.

Combining with the main flow of air in the duct 11, the cooled and humidity regulated air, modulates the temperature and humidity of the entire volume of the air flowing into the cabin, whereby the temperature and humidity of the air in the cabin are maintained within a predetermined range of values.

I claim as my invention:

1. In a cabin air conditioning system of the character described, the combination of: means for recirculating a main flow of cabin air; means for diverting and compresing a part of said main flow of air; a cooling means; means for passing the diverted compressed air through said cooling means to cool the same; means for reexpanding and further cooling the compressed, cooled air; means for removing moisture from only a part of the reexpanded air; and means for delivering said part of the air back into said main flow of air.

2. In a cabin air conditioning system of the character described, the combination of: means for recirculating a main flow of cabin air; means for diverting and compressing a part of said main flow of air; a cooling means; means for passing the diverted compressed air through said cooling means to cool the same; means for reexpanding and further cooling the compressed, cooled air; and a humidity control unit receiving the reexpanded and cooled air, said unit having two paths of flow for the air leading back into said main flow of air, one of said paths of flow having moisture removing means therein, and a proportioning valve for directing said reexpanded air through said paths of flow, and means responsive to the humidity of the cabin air for controlling said valve, whereby moisture will be removed from only a portion of said reexpanded air in accordance with the deviation of the humidity of the cabin air from a prescribed range.

3. In a cabin air conditioning system of the character described, the combination of: means for recirculating a main flow of cabin air; means for diverting and compressing a part of said main flow of air; a cooling means; means for passing the diverted compressed air through said cooling means to cool the same; means for reexpanding and further cooling the compressed, cooled air; means operating in response to changes in temperature of the cabin air for controlling the action of said cooling means; means for removing moisture from only a part of the reexpanded air; and means for delivering said part of the air back into said main flow of air.

4. In a cabin air conditioning system of the character described, the combination of: means for recirculating a main flow of cabin air; means for diverting and compressing a part of said main flow of air; a cooling means; means for passing the diverted compressed air through said cooling means to cool the same; means operating in response to changes in temperature of the cabin air for controlling the action of said cooling means; means for reexpanding and further cooling the compressed, cooled air; and a humidity control unit receiving the reexpanded and cooled air, said unit having two paths of flow for the air leading back into said main flow of air, one of said paths of flow having moisture removing means therein, and a proportioning valve for directing said reexpanded air through said paths of flow, and means responsive to the humidity of the cabin air for controlling said valve, whereby moisture will be removed from only a portion of said reexpanded air in accordance with the deviation of the humidity of the cabin air from a prescribed range.

5. In a cabin air conditioning system of the character described, the combination of: means for recirculating a main flow of cabin air; means for diverting and compressing a part of said main flow of air; a cooling means; means for passing the diverted compressed air through said cooling means to cool the same; means operating in response to changes in temperature of the cabin air for controlling the action of said cooling means; means for reexpanding and further cooling the compressed, cooled air; and a humidity control unit receiving the reexpanded and cooled air, said unit having two paths of flow for the air leading back into said main flow of air, one of said paths of flow having moisture removing means therein, a proportioning valve for directing said reexpanded air through said paths of flow, and means responding to changes in the humidity of the cabin air for adjusting the position of said proportioning valve, whereby moisture will be removed from only a portion of said reexpanded air in accordance with the deviation of the humidity of the cabin air from a prescribed range.

6. In a cabin air conditioning system of the character described, the combination of: means for recirculating a main flow of cabin air; means for diverting and compressing a part of said main flow of air; a cooling means; means for passing the diverted compressed air through said cooling means to cool the same; means for reexpanding and further cooling the compressed, cooled air; and a humidity control unit receiving the reexpanded and cooled air, said unit having two paths of flow for the air leading back into said main flow of air, one of said paths of flow having moisture removing means therein, flow straightening means, at least in the outlet part of said unit, and a proportioning valve for directing said reexpanded air through said paths of flow, and means responsive to the humidity of the cabin air for controlling said valve, whereby moisture will be removed from only a portion of said reexpanded air in accordance with the deviation of the humidity of the cabin air from a prescribed range.

7. In a cabin air conditioning system having means for circulating air, the combination of: means for passing a first flow of air into the cabin; means for compressing a second flow of air; a cooling means; means for passing the compressed air through said cooling means to cool the same; means for reexpanding and further cooling the compressed, cooled air; means for removing moisture from only a part of the reexpanded air; and means for delivering said second flow of air into said first flow of air.

8. In a cabin air conditioning system of the character described, the combination of: means for passing a main flow of air into the cabin; means for compressing a second flow of air; a cooling means; means for passing the compressed air through said cooling means to cool the same; means for reexpanding and further cooling the compressed, cooled air; and a humidity control unit receiving the reexpanded and cooled air, said unit having two paths of flow for the air leading into said main flow of air, one of said paths of flow having moisture removing means therein, and a proportioning valve for directing said reexpanded air through said paths of flow, a humidostat for controlling said valve, whereby moisture will be removed from only a portion of said reexpanded air in accordance with the deviation of the humidity of the cabin air from a prescribed range.

9. In a cabin air conditioning system of the character described, the combination of: means for passing a main flow of air into the cabin; means for compressing a second flow of air; a cooling means; means for passing the compressed air through said cooling means to cool the same; means for reexpanding and further cooling the compressed, cooled air; and a humidity control unit receiving the reexpanded and cooled air, said unit having two paths of flow for the air leading into said main flow of air, one of said paths of flow having moisture removing means therein, a proportioning valve for directing said reexpanded air through said paths of flow, and means responding to changes in the humidity of the cabin air for adjusting the position of said proportioning valve, whereby moisture will be removed from only a portion of said reexpanded air in accordance with the deviation of the humidity of the cabin air from a prescribed range.

10. In a cabin air conditioning system of the character described, the combination of: means for passing a main flow of air into the cabin; means for compressing a second flow of air; a cooling means; means for passing the compressed air through said cooling means to cool the same; means operating in response to changes in temperature of the cabin air for controlling the action of said cooling means; means for reexpanding and further cooling the compressed, cooled air; and a humidity control unit receiving the reexpanded and cooled air, said unit having two paths of flow for the air leading into said main flow of air, one of said paths of flow having moisture removing means therein, and a proportioning valve for directing said reexpanded air through said paths of flow, and means responsive to the humidity of the cabin air for controlling said valve, whereby moisture will be removed from only a portion of said reexpanded air in accordance with the deviation of the humidity of the cabin air from a prescribed range.

11. In a cabin air conditioning system of the character described, the combination of: means for passing a flow of air into the cabin; means for compressing said flow of air; a cooling means; means for passing the compressed air through said cooling means to cool the same; means for reexpanding and further cooling the compressed cooled air; and a humidity control unit receiving the reexpanded and cooled air, said unit having two paths of flow for the air leading toward the cabin, one of said paths of flow having moisture removing means therein, a proportioning valve for directing said reexpanded air through said paths of flow, and means responding to changes in the humidity of the cabin air for adjusting the position of said proportioning valve, whereby moisture will be removed from only a portion of said reexpanded air in accordance with the deviations of the humidity of the cabin air from a prescribed range.

12. In a cabin air conditioning system of the character described, the combination of: means for passing a flow of air into the cabin; means for compressing said flow of air; a cooling means; means for passing the compressed air through said cooling means to cool the same; means operating in response to changes in temperature of the cabin air for controlling the action of said cooling means; means for reexpanding and further cooling the compressed cooled air; and a humidity control unit receiving the reexpanded and cooled air, said unit having two paths of flow for the air leading toward the cabin, one of said paths of flow having moisture removing means therein, a proportioning valve for directing said reexpanded air through said paths of flow, and means responding to changes in the humidity of the cabin air for adjusting the position of said proportioning valve, whereby moisture will be removed from only a portion of said reexpanded air in accordance with the deviations of the humidity of the cabin air from a prescribed range.

13. In a cabin air conditioning system having means for circulating air, the combination of: means for passing a flow of air into the cabin; means for compressing said flow of air; a cooling means; means for passing said compressed air through said cooling means to cool the same; means for reexpanding and further cooling the compressed cooled air; a humidity control unit receiving the reexpanded and cooled air, said unit having two paths of flow for the air leading toward the cabin, one of said paths of flow having moisture removing means therein; a proportioning valve for directing said reexpanded air through said paths of flow; and means responding to changes in the humidity of the cabin air for adjusting the position of said proportioning valve, said air compressing means, cooling means, reexpanding means and humidity control unit being arranged in series.

SOREN K. ANDERSEN.

REFERENCES CITED

The following references are of record in the file of this patent:

UNITED STATES PATENTS

| Number | Name | Date |
|---|---|---|
| 2,054,158 | Hadjisky | Sept. 15, 1936 |
| 2,175,469 | Kaufman | Oct. 10, 1939 |
| 2,364,458 | McCollum | Dec. 5, 1944 |